United States Patent [19]

Shimada

[11] Patent Number: 5,177,653
[45] Date of Patent: Jan. 5, 1993

[54] FLOATING MAGNETIC HEAD INCLUDING A DURABLE SEALING GLASS COMPOUND

[75] Inventor: Yoshinori Shimada, Kokubu, Japan
[73] Assignee: Kyocera Corporation, Kyoto, Japan
[21] Appl. No.: 558,157
[22] Filed: Jul. 24, 1990
[30] Foreign Application Priority Data
  Jul. 31, 1989 [JP] Japan .................. 1-198567
[51] Int. Cl.$^5$ ............... G11B 5/60; G11B 15/64; G11B 17/32; G11B 21/20
[52] U.S. Cl. ........................ 360/103; 360/122; 360/126
[58] Field of Search ............ 360/110, 126, 127, 122, 360/119, 120, 103; 252/62.6, 62.58, 62.59, 518

[56] References Cited

U.S. PATENT DOCUMENTS 3,520,831  7/1970  Trap .................... 360/119
4,741,849  5/1988  Naito et al. .......... 252/62.6
5,008,767  4/1991  Iwata et al. .......... 360/122

Primary Examiner—Aristotelis Psitos
Assistant Examiner—Alfonso Garcia
Attorney, Agent, or Firm—Spensley Horn Jubas & Lubitz

[57] ABSTRACT

A compound floating magnetic head is provided for writing and reading of data to and from a magnetic medium. The head includes a ferrite core, a non-magnetic slider, the ferrite core being disposed in a core slit disposed in the slider and coupled to the slider by sealing glass. In one embodiment, the magnetic head is characterized in that the sealing glass comprises 60 to 80% PbO by weight, 6.5 to 25% $SiO_2$ by weight, 1 to 10% $B_2O_3$ by weight and a 1 to 10% $Bi_2O_3$ by weight as main ingredients, wherein $SiO_2 + B_2O_3$ is >10% by weight and $SiO_2/B_2O_3$ is >2. With the head of the present invention, deterioration of the electromagnetic conversion characteristics by sealing glass is prevented and the head has very high reliability.

4 Claims, 3 Drawing Sheets

FLOATING MAGNETIC HEAD INCLUDING A DURABLE SEALING GLASS COMPOUND

BACKGROUND OF THE INVENTION

1. Field of the Invention

The present invention relates to a compound floating magnetic head that writes and reads data to and from a magnetic recording medium such as a magnetic disk, and more particularly to a compound floating magnetic head including sealing glass that is chemically stable even in a highly humid environment.

2. Prior Art

A conventional compound floating magnetic head uses dynamic pressure generated by the travel of a magnetic medium such as a magnetic disk to float the slider of the head with a very small gap between the head and the medium. The ferrite core disposed at the slider section where the gap is the narrowest writes and read data.

The compound floating magnetic head comprises a ferrite core 20 composed of an I-shaped bar 21 and a C-shaped bar 22 shown in FIG. 1 (a), and a non-magnetic slider 10 shown in FIG. 1 (b).

The I-shaped bar 21 and the C-shaped bar 22 are coupled at two positions (front gap FG and back gap BG) and integrated into the ferrite core 20. Front gap FG is positioned on the side of the recording medium (not shown). The length of the gap is determined to a specified width depending on the recording density of the recording medium.

To maintain the gap length at the (specified width), reinforcing bonding glass 23 is formed at the sloped portion on the side of front gap FG.

Furthermore, on the side of front gap FG, the front end of the ferrite core 20 has a step with a specified width that depends on the track width of the recording medium.

The slider 10 is basically a rectangular parallelopiped. To float the slider 10 apart from the recording medium with a specified gap, floating rails 12 and 13 and bleed groove 14 are formed on the surface 11 of the slider 10 that faces the recording medium.

A core accommodation groove (core slit) 16 with a specified depth is formed in the longitudinal direction on the trailing end surface 15 of the floating rail 12.

As shown in FIG. 1 (c), the ferrite core 20 is coupled with a non-magnetic slider 10 in the core slit 16 of the slider 10 by using sealing glass 17. An coupling process is explained below referring to FIG. 1 (d). The ferrite core 20 is temporarily held in the core slit 16 of the slider 10. A bare 18 that is to be melted to form the sealing glass 17 is then placed on the core 20. By heat treatment at a specified temperature, the bar 18 is softened and melted to fill the core slit 16 with the sealing glass 17, thus securing the ferrite core 20 to the slider 10.

In the above-mentioned coupling process, it is important to set heat treatment temperature T1 required to soften and melt the bar 18 to form the sealing glass 17 sufficiently lower than softening temperature T2 of the reinforcing bonding glass 23 of the ferrite core 20 (T1<T2). If heat treatment temperature T1 is set higher than softening temperature T2 of the reinforcing bonding glass 23, the specified electromagnetic conversion characteristics required between the magnetic medium and the ferrite core 20 are deteriorated. For example, the specified gap length on the front gap (FG) side becomes larger.

Conventionally, glass including much lead oxide was used as the sealing glass 17 to obtain a lower softening point. The sealing glass 17 that was used generally comprises 78% PbO by weight, 2.6% $SiO_2$ by weight and 10% $B_2O_3$ by weight. By including much PbO and $B_2O_3$ as described above, the sealing glass 17 was easily able to have a low softening point sufficiently lower than softening point T2 of the bonding glass 23. However, when a conventional compound floating magnetic head with this kind of sealing glass 17 was left in a very humid environment, a moisture absorption layer was formed on the sealing glass 17. Chemically, the metal ions included in the sealing glass 17 reacted with hydroxyl groups, weathering and corroding the glass surface. These caused problems: discoloration of the exterior, damage to the recording medium due to dropping of substances precipitated by chemical reaction, and attachment of the magnetic powder of the recording medium to cavity portions from which the precipitated substances were separated.

In any case of the above-mentioned problems, noise was caused during writing and reading data to and from the recording medium, significantly reducing the reliability of the electromagnetic conversion characteristics.

SUMMARY OF THE INVENTION

Accordingly, it is an object of the present invention to provide a highly reliable compound floating magnetic head by using sealing glass which is highly durable in severe environmental conditions.

To attain the above-mentioned object, the present invention provides a compound floating magnetic head wherein a ferrite core is coupled with a non-magnetic slider in a core slit disposed in the slider by using sealing glass, the magnetic head being characterized in that the sealing glass comprises 60 to 80% PbO by weight, 6.5 to 25% $SiO_2$ by weight, 1 to 10% $B_2O_3$ by weight and 1 to 10% $Bi_2O_3$ by weight as main ingredients, wherein $SiO_2+B_2O_3>10\%$ by weight and $SiO_2/B_2O_3>2$.

BRIEF DESCRIPTION OF THE DRAWINGS

The present invention will be detailed referring to the following drawings.

FIG. 1 (b) is a perspective view of a slider.

FIG. 1 (c) is a perspective view of the coupling section of the ferrite core and the slider.

FIG. 1 (d) is an external view illustrating a coupling process using sealing glass.

FIG. 3 (b) is a prespective view similar to FIG. 3 (a) illustrating a surface configuration of the coupling section of a conventional compound floating magnetic head.

DETAILED DESCRIPTION OF THE INVENTION

Figure 1A:
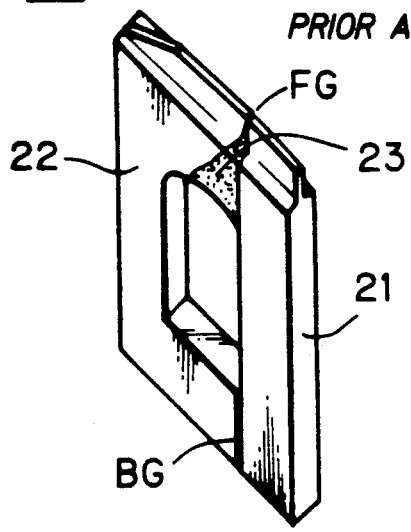
FIG. 1 (a) is a perspective view of a ferrite core used in a typical compound floating magnetic head.
Figure 1C:
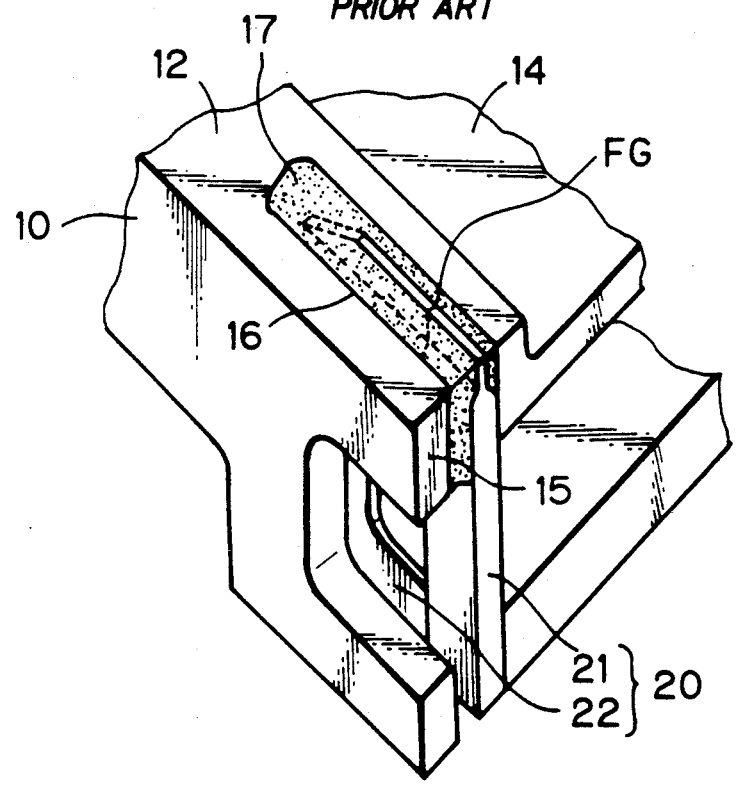
Figure 1B:
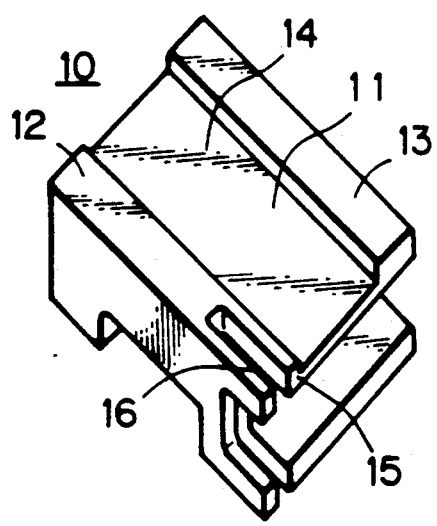
Figure 1D:
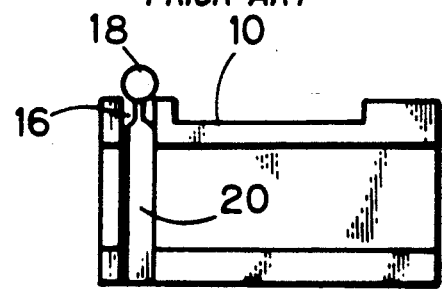

The compound floating magnetic head of the present invention comprises a ferrite core 20 composed of an I-shaped bar 21 and a C-shaped bar 22 shown in FIG. 1 (a), and a non-magnetic slider 10 shown in FIG. 1 (b).

The I-shaped bar 21 and the C-shaped bar 22 are coupled at front gap FG and back gap BG and integrated into the ferrite core 20. Front gap FG is set to a gap length (width) of 0.3 to 1 um. To maintain this specified gap length, reinforcing bonding glass 23 is formed at the sloped portion on the side of front gap FG. The bonding glass 23 is made of silica and lead glass (softening point T2 560° C.). On the side of front gap FG, the front end of the ferrite core 20 has a step with a specified width that depends on the track width of the recording medium.

To float the slider 10 from the recording medium with a specified gap, floating rails 12 and 13 and bleed groove 14 are formed on the surface 11 of the slider 10 that faces the recording medium. A core slit 16 with a specified depth is formed in the longitudinal direction on the trailing end surface 15 of the floating rail 12.

As shown in FIG. 1 (c), the ferrite core 20 is temporarily held in the core slit 16, and coupled with the slider 10 by using sealing glass 17.

An actual coupling process is explained below referring to FIG. 1 (d). The ferrite core 20 is temporarily held in the core slit 16 of the slider 10. A bar 18 made of the sealing glass 17 is then placed on the core 20. By heat treatment at a specified temperature, the bar 18 is softened and melted to fill the core slit 16 with the sealing glass 17, thus securing the ferrite core 20 to the slider 10.

The sealing glass used in the embodiment of the present invention comprises 70% PbO by weight, 16% $SiO_2$ by weight, 4% $B_2O_3$ by weight and 7% $Bi_2O_3$ by weight as main ingredients, wherein $SiO_2 + B_2O_3 = 20\%$ by weight and $SiO_2/B_2O_3 = 4$.

By using the sealing glass 17 having the above-mentioned composition, softening point T1 (495° C.) of the sealing glass 17 can be set sufficiently lower than softening point T2 (560° C.) of the reinforcing bonding glass 23, and the sealing section can have excellent chemical and structural stability.

Heat treatment temperature T1 of the sealing glass 17 should be set sufficiently lower than softening point T2 of the reinforcing bonding glass 23 so that the visocosity of the sealing glass 17 has a specified value when the glass 17 is filled into the core slit 16. An actual viscosity value of the sealing glass 17 used to fill the core slit 16 should be in the range of $10^{5.5}$ to $10^{6.5}$ poise. If the viscosity is smaller than $10^{5.5}$ poise, the sealing glass 17 has too high fluidity and flows excessively to portions where filling is not necessary, causing problems when a coil (not shown) is formed around the I-shaped bar 21 of the ferrite core 20. If the viscosity is larger than $10^{6.5}$ poise, the glass has too low fluidity. This causes problems in sealing and the bonding area of the glass becomes too small, resulting in low strength.

Figure 2:
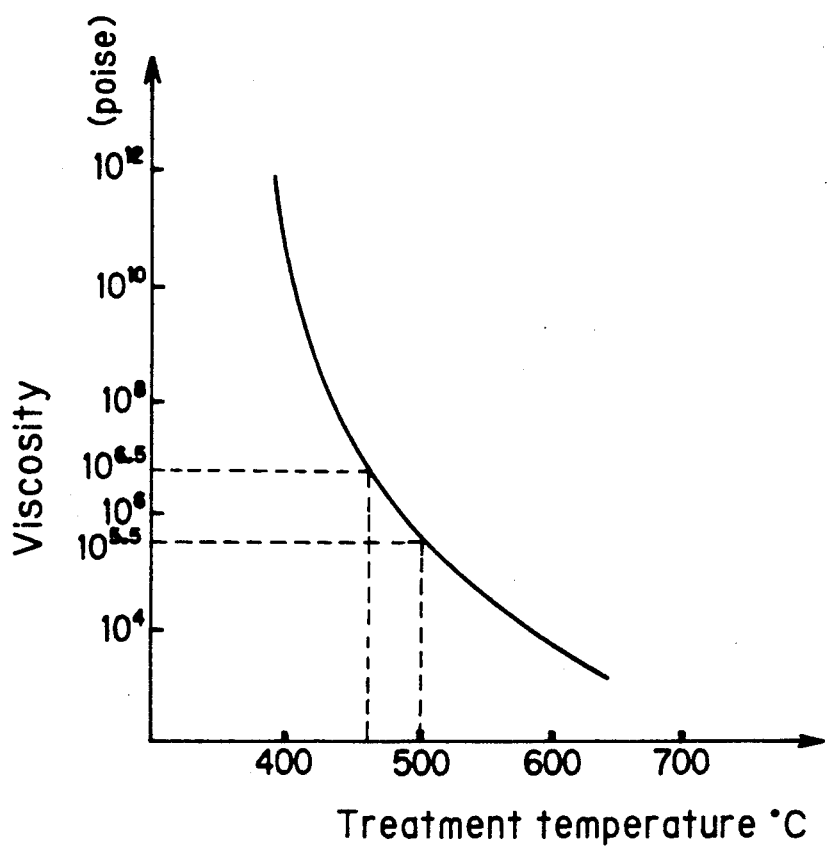
FIG. 2 is a characteristic graph illustrating the relationship between the treatment temperature and the viscosity of the sealing glass of the present invention.

As described above, heat treatment temperature T1 (peak temperature) of the sealing glass 17 should be set between 460° C. (viscosity $10^{6.5}$ poise) and 500° C. (viscosity $10^{5.5}$ poise), considering the softening temperature of the bonding glass 23 and the viscosity shown in FIG. 2.

It is important that the sealing glass comprises 60 to 80% PbO by weight, 6.5 to 25% $SiO_2$ by weight, 1 to 10% $B_2O_3$ by weight and 1 to 10% $Bi_2O_3$ by weight as main ingredients, wherein $SiO_2 + B_2O_3 > 10\%$ by weight and $SiO_2/B_2O_3 > 2$.

After carefully studying the weight percentage of the ingredients in many ways, the inventors of the present invention found that PbO acted to lower the softening point and determined the composition rate of PbO in the range of 60 to 80% by weight. If the composition rate of PbO is less than 60% by weight, the sealing glass 17 is deteriorated in chemical durability and requires higher heat treatment temperature. If the composition rate of PbO is more than 80% by weight, the sealing glass 17 is significantly crystallized and has lower fluidity when the glass bar 18 is softened and melted to fill the core slit 16.

$SiO_2$, a basic glass ingredient, acts to improve moisture resistance. The composition rate of $SiO_2$ was determined in the range of 6.5 to 25% by weight. If the composition rate of $SiO_2$ is less than 6.5% by weight, the sealing glass 17 is deteriorated in chemical durability and has lower fluidity. If the composition rate of $SiO_2$ is more than 25%, the sealing glass requires higher treatment temperature. $B_2O_3$ acts to lower the softening point and controls value $\alpha$ (coefficient of linear expansion). The composition rate of $B_2O_3$ was determined in the range of 1 to 10% by weight. If the composition rate of $B_2O_3$ is less than 1% by weight, the sealing glass 17 requires higher treatment temperature. If the composition rate of $B_2O_3$ is more than 10% by weight, phase separation is apt to occur in the sealing glass 17 and the sealing glass 17 is deteriorated in water resistance.

In addition, $Bi_2O_3$ acts to lower the softening point of the sealing glass 17 and improves the chemical stability of the glass. The composition rate of $Bi_2O_3$ was determined in the range of 1 to 10% by weight.

EXAMPLES

The samples (examples of the present invention and contrast examples) were prepared according to Table 1 and tested regarding the testing items shown in Table 2.

TABLE 1

| Sample No. | Ingredients % by weight | | | | | $SiO_2 + B_2O_3$ | $SiO_2/B_2O_3$ | Softening point |
|---|---|---|---|---|---|---|---|---|
| | PbO | $SiO_2$ | $B_2O_3$ | $Bi_2O_3$ | Others | | | |
| 1 | 70.0 | 16.0 | 4.0 | 6.0 | 4.0 | 20.0 | 4.0 | 460° C. |
| 2 | 70.0 | 17.0 | 5.7 | 4.5 | 2.8 | 22.7 | 3.0 | 460° C. |
| *3 | 77.7 | 2.6 | 10.2 | 0.0 | 9.5 | 12.8 | 0.25 | 427° C. |
| *4 | 56.0 | 27.0 | 10.0 | 0.0 | 7.0 | 37.0 | 2.7 | 520° C. |
| *5 | 84.0 | 11.7 | 0.0 | 0.0 | 4.3 | 11.7 | — | 480° C. |

Note: The samples marked * are contrast examples not applicable to the present invention.

TABLE 2

| | Testing items | | |
|---|---|---|---|
| Sample No. | Moisture resistance | Expansion of the gap depending on the softening point | Fluidity |
| 1 | o | o | o |

TABLE 2-continued

| Sample No. | Testing items | | |
|---|---|---|---|
| | Moisture resistance | Expansion of the gap depending on the softening point | Fluidity |
| 2 | o | o | o |
| *3 | x | o | o |
| *4 | o | x | x |
| *5 | x | o | x |

Note: o: proper, x: Improper

OBSERVATION

Figure 3A:
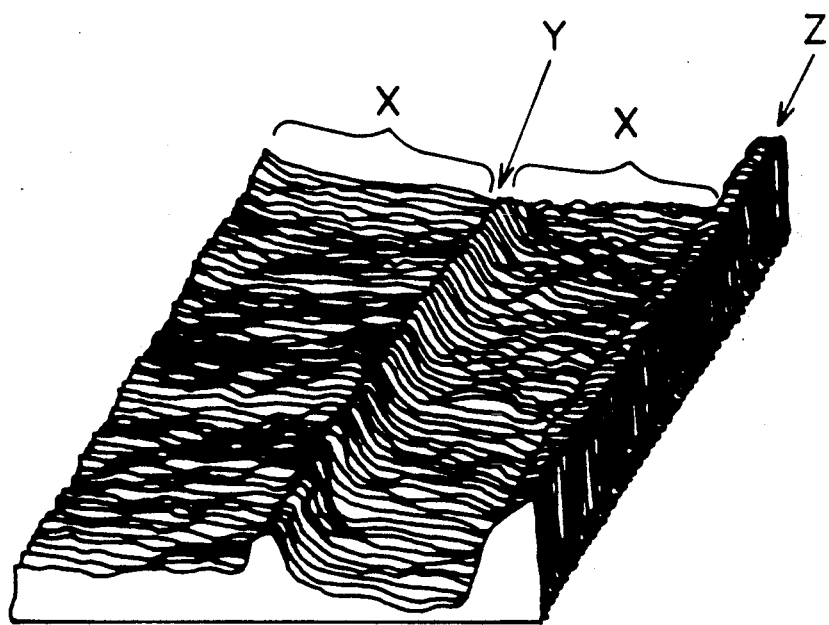
FIG. 3 (a) is a prespective view (×1000, measured by an optical surface roughness measuring instrument) of a surface configuration of the coupling section of the compound floating magnetic head including the sealing glass of the present invention.
Figure 3B:
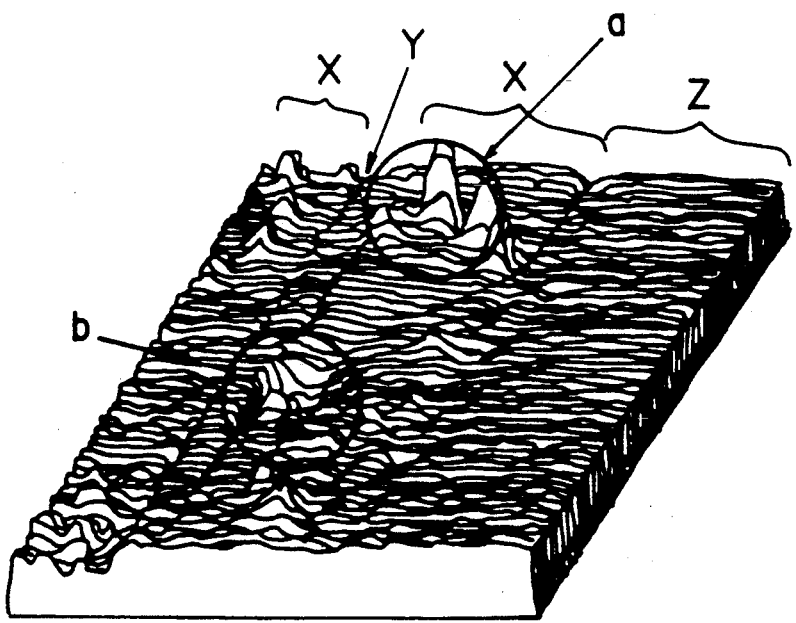

If the sealing glass is inferior in humidity resistance as in the case of contrast examples 3 and 5, the glass has a rough surface configuration as shown in FIG. 3 (b). If the softening point of the glass is more than 500° C. as in the case of contrast example 4, it comes close to the softening point (560° C. for example) of the bonding glass. This may change the electromagnetic conversion characteristics due to expansion of the gap. In addition, if the sealing glass is inferior in fluidity as in the case of example 5, the bonding area between the core and the slider is restricted, reducing the bonding strength. Unlike these examples, examples 1 and 2 of the present invention showed superior results in all testing items: humidity resistance, gap expansion and fluidity. Consequently, the surface configuration of the glass has been improved greatly as shown in FIG. 3 (a).

To confirm the effects of the present invention, the compound floating magnetic head wherein the ferrite core 20 was coupled in the core slit 16 of the slider 10 by using the sealing glass 17 was subjected to a humidity resistance test for 240 hours at 40° C. and 95% RH. The front surfaces of the sealing glass 17, ferrite core 20 and slider 10 were mirror-finished. After the humidity resistance test, the surface roughness of the core slit 16 was measured by an optical surface roughness measuring instrument. FIG. 3 (a) is a perspective view (×1000 measured by the optical surface roughness measuring instrument) of the coupling section of the compound floating magnetic head including the sealing glass 17 of the present invention. FIG. 3 (b) is a perspective view similar to FIG. 3 (a) illustrating the coupling section of a conventional compound floating magnetic head. The sealing glass 17 is located at section X. Section Y corresponds to the front end of the ferrite core 20 and section Z corresponds to the edge of the core slit 16 of the slider 10.

As clearly indicated by FIG. 3 (a), in the case of the compound floating magnetic head of the present invention, even projections are found along the entire width only at section Y that corresponds to the front end of the ferrite core 20 and section Z that corresponds to the edge of the slider 10. The surface of section X of the sealing glass 17 filled between sections Y and Z is smooth.

In the case of the conventional compound floating magnetic head shown in FIG. 3 (b), the surface of section X of the sealing glass 17 enclosing section Y that corresponds to the front end of the ferrite core 20 is rough. Projection a, for example, may damage the recording medium or drop to the recording medium. Recess b may collect magnetic powder from the recording medium. These uneven portions may cause noise to electromagnetic conversion characteristics. In actual appearance, such projection a and recess b are generated as white spot substances precipitated on the surface or brown discolored portions on the surface because of chemical changes.

The sealing glass 17 of the present invention having the above-mentioned composition is chemically stable in a highly humid environment and the mirror surface of the sealing glass 17 is maintained properly. This completely eliminates damage to the recording medium due to precipitated substances and attachment of magnetic powder generated from the recording medium, to thereby make electromagnetic conversion characteristics stable.

In addition, since softening point T1 of the sealing glass 17 is sufficiently lower than softening point T2 of the bonding glass 23, the gap length of the compound floating magnetic head can be made uniform. This can stabilize the magnetic conversion characteristics of the head.

Furthermore, with the present invention, the slider 10 and the ferrite core 20 can be coupled with each other at a proper viscosity value at softening point T1 sufficiently lower than softening point T2 of the bonding glass 23. This increases the coupling strength between the slider 10 and the ferrite core 20 and makes it easy to form a coil around the I-shaped bar 21.

As described above, the present invention uses the sealing glass that has a low softening point and is superior in environmental resistance to prevent the electromagnetic conversion characteristics of the head from being deteriorated by the sealing glass. The present invention can thus provide a very reliable compound floating magnetic head.

I claim:

1. A compound floating magnetic head, comprising:
a non-magnetic slider having a core slit;
a ferrite core disposed in the core slit;
sealing glass coupling the non-magnetic slider to the ferrite core, the sealing glass, comprising:
60 to 80% PbO by weight,
6.5 to 25% $SiO_2$ by weight,
1 to 10% $B_2O_3$ by weight,
1 to 10% $Bi_2O_3$ by weight; and
wherein $SiO_2 + B_2O_3$ is >10% by weight and $SiO_2/B_2O_3$ is >2.

2. A compound floating magnetic head according to claim 1, wherein the ferrite core has a front end and a rear end, the sealing glass has a length and a width and includes even projections along the entire width only at the section that corresponds to the front end of the ferrite core and the section that corresponds to the edge of the slider, and the section of the sealing glass between the two sections has a smooth surface.

3. A compound floating magnetic head according to claim 1, wherein the sealing glass has a softening point of 460° to 500° C. and a viscosity of $10^{5.5}$ to $10^{6.5}$ poise when softened and melted.

4. A compound floating magnetic head according to claim 1, 2 or 3, wherein the sealing glass comprises:
70% PbO by weight,
16% $SiO_2$ by weight,
4% $B_2O_3$ by weight,
7% $Bi_2O_3$ by weight as main ingredients; and
wherein $SiO_2 + B_2O_3 = 20\%$ by weight and $SiO_2/B_2O_3 = 4$.

* * * * *